United States Patent [19]

Kon

[11] Patent Number: 5,708,892
[45] Date of Patent: Jan. 13, 1998

[54] SUPPORT STRUCTURE OF A FOCAL PLANE SHUTTER IN A CAMERA

[75] Inventor: Yasuhiko Kon, Kawasaki, Japan

[73] Assignee: Nikon Corporation, Tokyo, Japan

[21] Appl. No.: 811,532

[22] Filed: Mar. 4, 1997

[30] Foreign Application Priority Data

Mar. 4, 1996 [JP] Japan ................................ 8-045987

[51] Int. Cl.$^6$ .................................................... G03B 9/36
[52] U.S. Cl. .......................... 396/452; 396/484; 396/486
[58] Field of Search .................................. 396/452, 453, 396/455, 456, 483, 484, 486, 487, 488, 489, 491, 492

[56] References Cited

U.S. PATENT DOCUMENTS

| | | | |
|---|---|---|---|
| 4,458,998 | 7/1984 | Tanaka et al. | 396/453 |
| 4,657,366 | 4/1987 | Tanabe et al. | 396/484 |
| 5,371,564 | 12/1994 | Hasuda | 396/487 |

FOREIGN PATENT DOCUMENTS

| | | |
|---|---|---|
| 58-118627 | 7/1983 | Japan. |
| 59-62837 | 4/1984 | Japan. |

Primary Examiner—A. A. Mathews

[57] ABSTRACT

A support structure of a focal plane shutter in a camera reduces the effects of impacts or vibrations accompanying opening and closing movements of a shutter such that the impacts or vibrations do not reach a camera body. The support structure includes a shutter baseplate which is mounted and floats with respect to the camera body. The shutter baseplate supports a number of light barrier members which move in a travel direction to expose photographic film. The shutter baseplate is movable in the travel direction by a pair of retaining members. The position of the shutter baseplate is set by a position setting member which is fixed to the shutter baseplate and is retained by a vibration absorbing member disposed in the camera body. Buffer members are disposed between upper and lower ends of the shutter baseplate and the camera body such that impacts or vibrations which accompany the opening and closing operation of the shutter do not reach the camera body via the shutter baseplate.

20 Claims, 3 Drawing Sheets

SUPPORT STRUCTURE OF A FOCAL PLANE SHUTTER IN A CAMERA

CROSS-REFERENCE TO RELATED APPLICATIONS

This application is based upon and claims priority of Japanese Patent Application No. 08-045987 filed Mar. 4, 1996, the contents being incorporated herein by reference.

BACKGROUND OF THE INVENTION

The present invention relates to a support structure of a focal plane shutter in a camera. More particularly, the present invention relates to a camera shutter support structure in which impacts and vibrations accompanying opening and closing movements of a camera shutter do not reach a camera body.

In cameras equipped with a shutter, such as a focal plane shutter having shutter blinds or vanes (hereinafter "light barrier member") which travels parallel to a film surface, camera vibration and impact noises arising from opening and closing actions of the shutter become a problem. Such camera vibration and impact noises are mainly due to impacts and vibrations which occur when movement of the light barrier member starts or stops.

Moreover, when actions are brought about which cause higher shutter speeds, the impacts and vibrations become greater. Due to actions which cause increased shutter speeds above a certain degree, the travel speed of the light barrier member itself has to increase. However, to satisfy this requirement, it is also necessary to increase the acceleration of the traveling light barrier member. Accordingly, when the acceleration increases, a necessary reaction is that the force received by the camera body in a direction opposite to the travel direction of the light barrier member is also increased.

The displacement of the camera body, in other words the camera vibration, cannot be regarded as negligible. In cases in which the camera is located on a tripod or similar support body, the camera body is displaced by this reaction during travel of the light barrier member. The camera then returns to its original position due to elasticity of the support body. The return of the camera is simultaneous with the end of travel of the light barrier member and thus simultaneous vibration occurs together with the support body.

This vibration continues for a relatively long period of time and is generated both at the shutter opening time and the shutter closing time. However, the continuation of the vibration after the shutter has closed has no effect on a photograph which has been taken because photography has already ended. On the other hand, the vibration which occurs when the shutter opens has direct adverse effects on the photograph being taken. It thus becomes necessary to mitigate the impacts and vibrations arising due to reaction of the light barrier member at the time of shutter opening so that the impacts and vibrations do not reach the camera body.

Consequently, the prior art, for example as described in Japanese Patent Publications JP-B-5-83892 [Japanese Granted Patent] and JP-B-5-8410, adopted an anti-vibration structure using weights. This anti-vibration structure included balancing weights which prevented the impacts and vibrations accompanying the motion and stopping of a light barrier member. The weights had an inertial mass greater than the light barrier member and operated in an opposite direction simultaneously with the light barrier member.

Nevertheless, in the prior art cameras in which anti-vibration structures consisting of balancing weights were included in the focal plane shutter, the problems were that the shutter itself became complicated, and the number of components and manufacturing operations were increased. In addition, it was necessary to insure space for location of the balancing weights. Moreover, when balancing weights having a large inertial mass were used, additional problems were that the weight of the camera body increased and the manufacturing costs became high.

BRIEF SUMMARY OF THE INVENTION

It is therefore an object of the present invention to provide a support structure of a focal plane shutter which reduces impacts or vibrations in a camera.

It is a further object of the present invention to reduce the effects of impacts or vibrations in a camera shutter while providing a simple structure with a small number of components.

It is still a further object of the present invention to mitigate the effects of impacts or vibrations which accompany the opening and closing operations of a camera shutter on a camera body.

Objects of the invention are achieved by a support structure of a focal plane shutter in a camera, including a camera body; a plurality of light barrier members to move in a travel direction with respect to the camera body; a shutter baseplate supporting the light barrier members and movable in the travel direction; a first buffer member disposed between a first side of the shutter baseplate and the camera body in the travel direction; and a second buffer member disposed between a second side of the shutter baseplate and the camera body in the travel direction.

Further objects of the invention are achieved by a support structure of a focal plane shutter in a camera including a position setting member connected between a camera body and a shutter baseplate to set a position of the shutter baseplate with respect to the camera body; and a vibration absorbing member disposed within the camera body and receiving the position setting member, wherein the vibration absorbing member absorbs vibration produced by light absorbing members during movement in a travel direction.

Even further objects of the invention are achieved by a support structure of a focal plane shutter in a camera including a retaining member connected to a camera body, a plurality of light barrier members to move in a travel direction with respect to the camera body, and a shutter baseplate to support the light barrier members, wherein the retaining member restricts movement of the shutter baseplate to the travel direction.

Moreover, objects of the invention are achieved by a support structure of a focal plane shutter in a camera including a setting member which applies a shutter charging force to open a plurality of light barrier members, wherein the direction of the shutter charging force is orthogonal to a travel direction of the light barrier members.

Objects of the invention are also achieved by a camera support structure, including a camera body; a light barrier member to move in a travel direction with respect to the camera body; a shutter baseplate supporting the light barrier member and movable in the travel direction; and a retaining member connected to the camera body and the shutter baseplate, wherein the retaining member restricts movement of the shutter baseplate to the travel direction.

Further objects of the invention are achieved by a support structure of an optical focal plane shutter, including a body; a plurality of light barrier members to move in a travel direction with respect to the body; a shutter baseplate supporting the light barrier members and movable in the travel direction; a first buffer member disposed between a first side of the shutter baseplate and the body in the travel direction; a second buffer member disposed between a second side of the shutter baseplate and the body in the travel direction; a position setting member connected between the body and the shutter baseplate to thereby set a position of the shutter baseplate with respect to the body; and a retaining member connected to the body and the shutter baseplate, wherein the retaining member restricts movement of the shutter baseplate to the travel direction.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
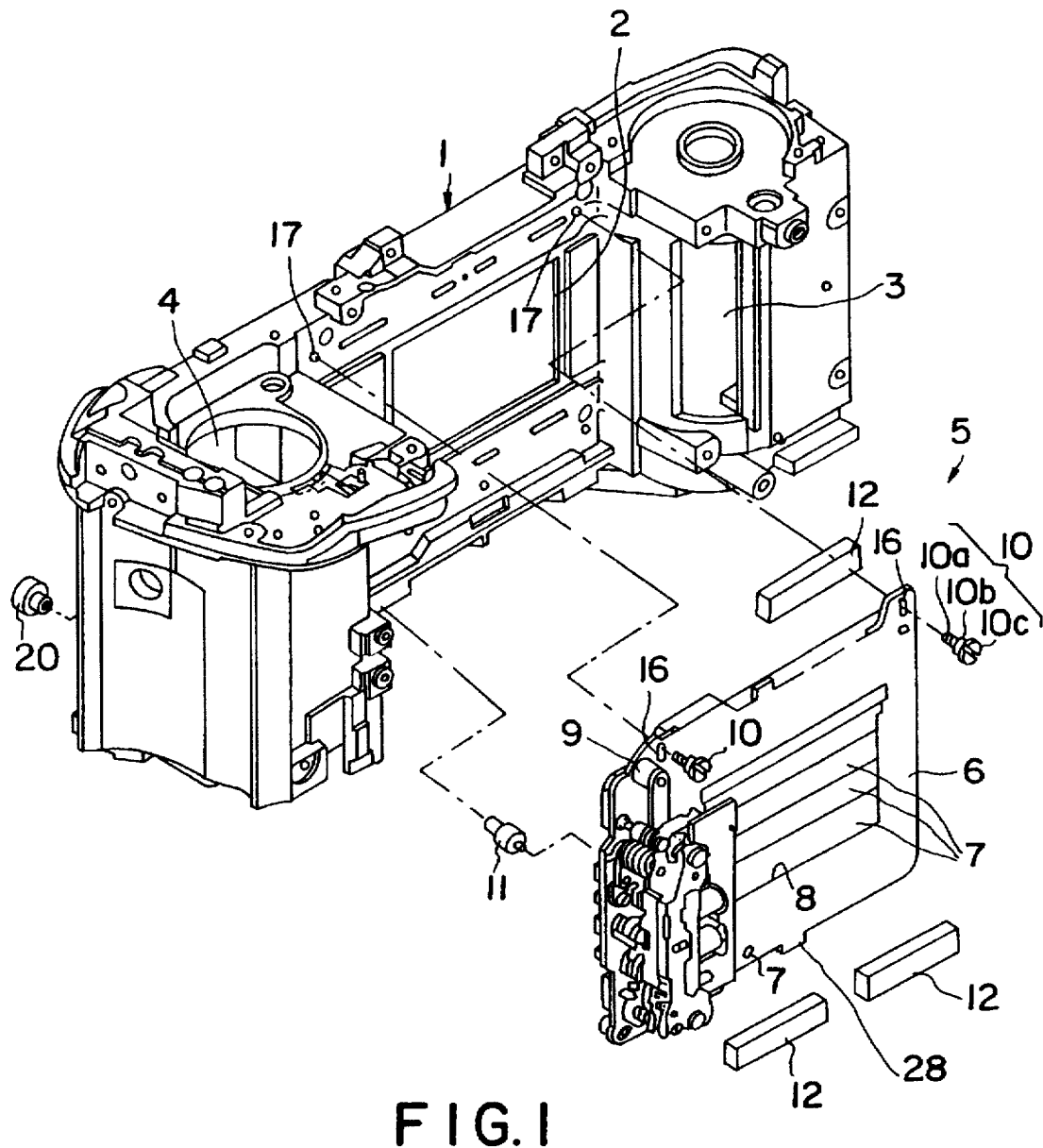
FIG. 1 is an exploded perspective view of a support structure of a focal plane shutter in a camera according to a preferred embodiment of the present invention.

Reference will now be made in detail to the preferred embodiments of the present invention, examples of which are illustrated in the accompanying drawings, wherein like reference numerals refer to like elements throughout.

Figure 2:
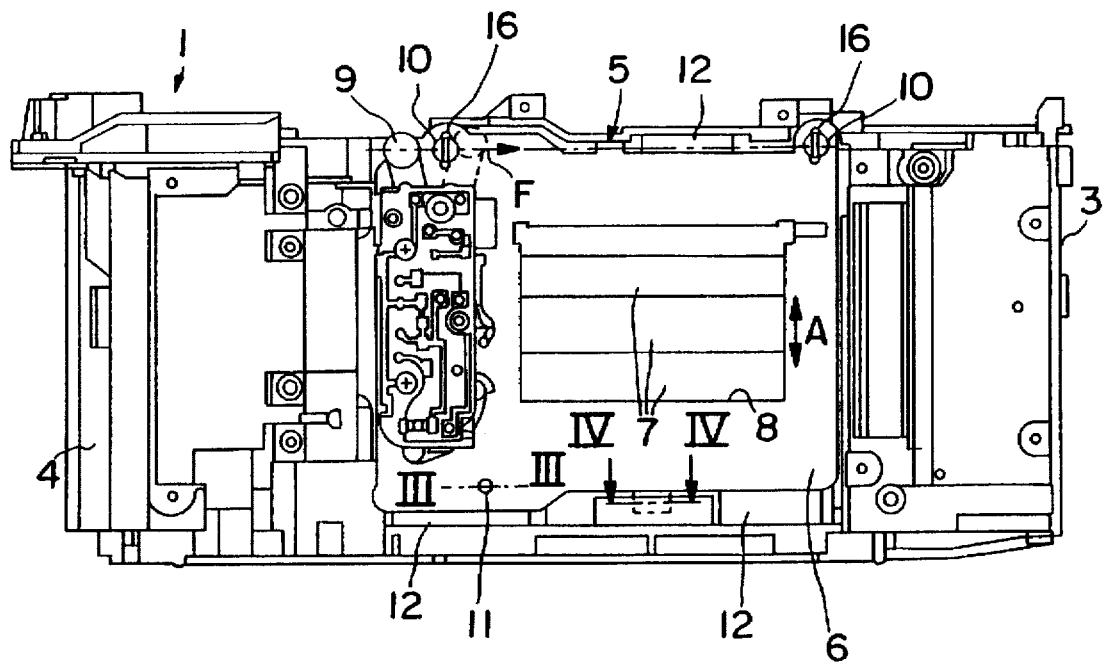
FIG. 2 is a sectional view of a focal plane shutter mounted in a camera body according to a preferred embodiment of the present invention.
Figure 3:
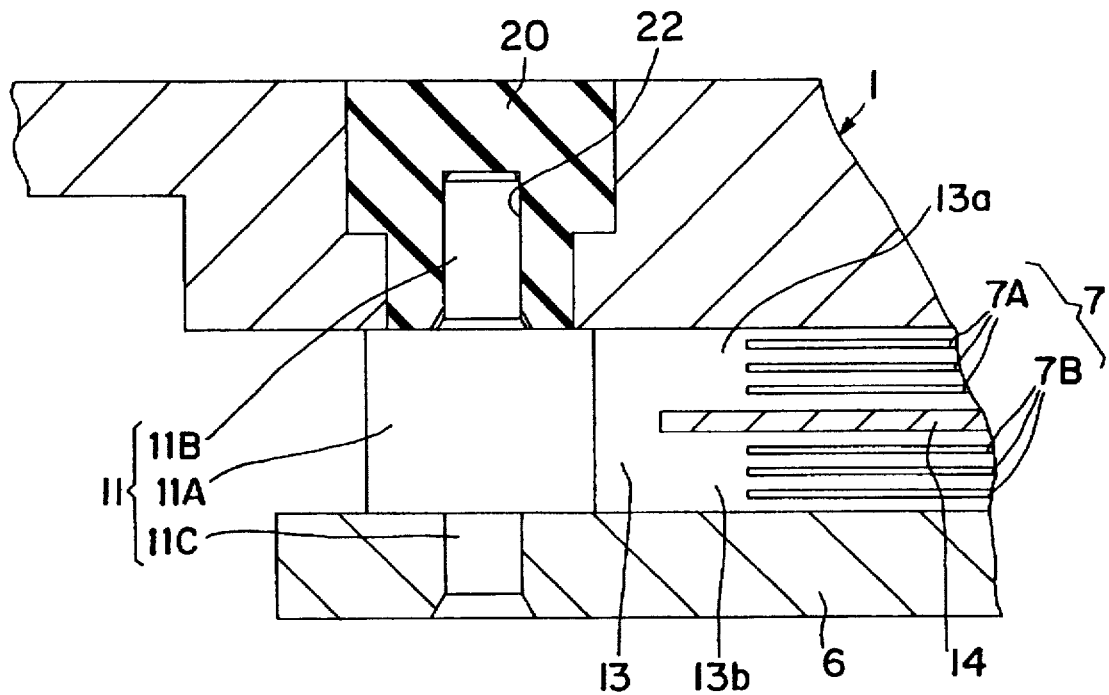
FIG. 3 is a cross sectional view of the focal plane shutter, taken along line III—III of FIG. 2.
Figure 4:
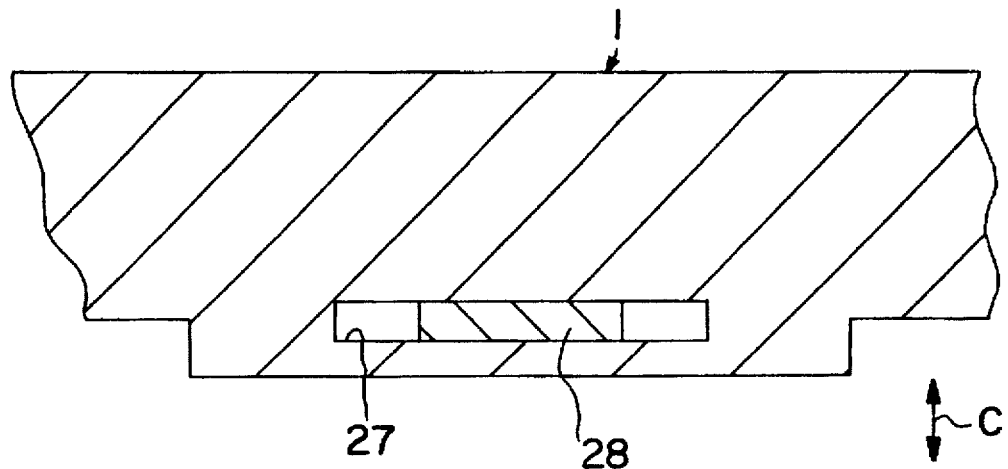
FIG. 4 is a cross sectional view of the focal plane shutter, taken along line IV—IV of FIG. 2.
Figure 5:
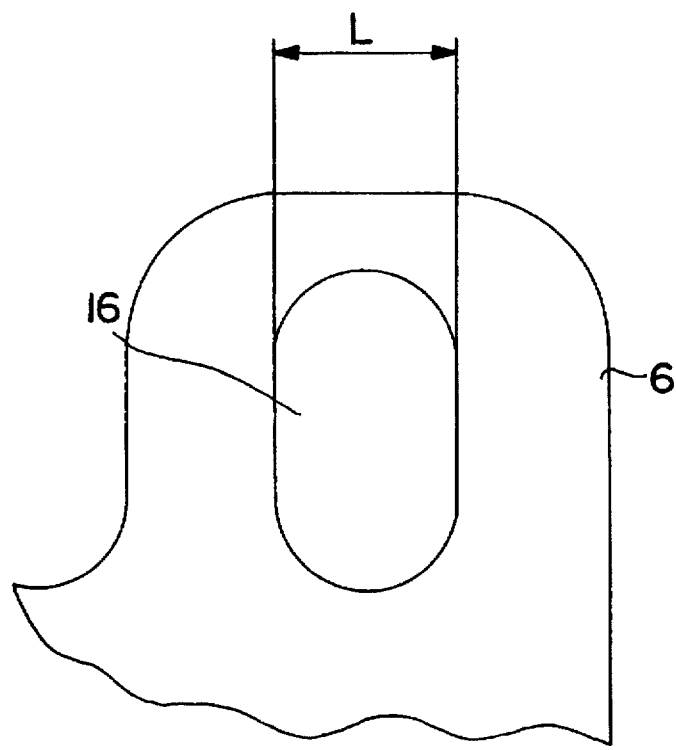
FIG. 5 is an elevated perspective view of a camera shutter baseplate according to a preferred embodiment of the present invention.

FIG. 1 is an exploded perspective view of a support structure of a focal plane shutter in a camera, with FIGS. 2–4 illustrating a number of sectional views taken along corresponding lines of FIG. 1. FIG. 5 is an elevated perspective view of a shutter baseplate. In these figures, camera body 1 has a full size exposure aperture unit 2 in the center, for example 24 mm×36 mm. A film cartridge compartment 3 and a windup spool compartment 4 are respectively arranged at two end portions of camera body 1.

Shutter 5 is a focal plane shutter which is equipped with a shutter baseplate 6 inserted with a slight clearance between a front surface center portion of camera body 1 and a photographic optical system (not shown). Shutter 5 is also equipped with a light barrier member 7 which is normally closed except during photography, and a setting member 9 which applies a shutter charging force to light barrier member 7. The shutter charging force returns the opened light barrier member 7 to its original closed position.

Shutter baseplate 6 has a rectangular aperture portion 8 having a central portion which is approximately the same size as aperture portion 2 for use in exposures. Rectangular aperture portion 8 retains travel of light barrier member 7 freely in up and down directions and also prevents displacement of light barrier member 7 in the camera optical axis direction.

Setting member 9 is mounted in a left-hand, upper angle of shutter baseplate 6. Shutter baseplate 6 is movable in the travel direction as illustrated by arrow A in FIG. 2, via two retaining members 10 in the front surface central portion of camera body 1, and via one position setting member 11 and plural buffer members 12.

Light barrier member 7, as illustrated in FIG. 3, comprises of plural shutter vanes which further include of front blind 7A and rear blind 7B. Blinds 7A and 7B are located in travel space 13 which is configured between camera body 1 and shutter baseplate 6. Travel space 13 is partitioned by a partition plate 14 into a front blind travel space 13a and a rear blind travel space 13b. According to the present preferred embodiments, a vane type of shutter has been applied. However, the shutter is not so limited and may be a blind type shutter.

Retaining member 10 is preferably in the form of a stepped screw. The stepped screw includes a male screw portion 10a, a large diameter portion 10b and a head portion 10c. Male screw portion 10a is threaded into a corresponding threaded hole 17 of camera body 1 through slotted hole 16 in shutter baseplate 6. Slotted hole 16 is long in the vertical direction. Large diameter portion 10b of the stepped screw is inserted into and slides freely within slotted hole 16. Thus, shutter baseplate 6 is retained and is freely movable in the travel direction of light barrier member 7. In other words, shutter baseplate 6 is movable in the up and down directions, and its movement is restricted from movement in the left and right directions.

As illustrated in FIG. 5, the transverse width L of slotted hole 16 prevents rattling of retaining member 10 by being set approximately the same as the diameter of the large diameter portion 10b of retaining screw 10. In addition, transverse width L is set such that shutter baseplate 6 is firmly secured to retaining member 10.

The mounting position of retaining member 10 is preferably positioned along the sides of the left and right upper end portions of shutter baseplate 6, and extends in a direction of the shutter charging force F (see FIG. 2) of setting member 9. When selecting such a position, because the direction of shutter charging force F is orthogonal to and in a plane parallel to the travel direction of light barrier member 7, a rotation of shutter baseplate 6 due to the shutter charging force F can be prevented and shutter charging can be reliably performed.

As illustrated in FIG. 3, position setting member 11 is in the form of a stepped pin with a body portion 11A of large diameter and two protruding portions 11B and 11C of small diameter. Body portion 11A controls travel space 13 by being interposed between camera body 1 and shutter baseplate 6. Small diameter portion 11B on one side is inserted into, and is supported by, a vibration absorbing member 20 which has been buried within camera body 1. The small diameter portion 11C is fixed by tightening, etc., into shutter baseplate 6. Moreover, according to the preferred embodiments of the present invention, position setting member 11 is fixed to the shutter baseplate 6, and vibration absorbing member 20 is buried within camera body 1. However, the reverse may be the case such that position setting member 11 is fixed to camera body 1 and vibration absorbing member 20 is built into shutter baseplate 6.

Vibration absorbing member 20 is of cylindrical shape and is made of a material having rubber-like elasticity. Blind hole 22, in which small diameter portion 11B on one side is press fit, is formed in the center of vibration absorbing member 20 facing shutter baseplate 6. When position setting member 11 is retained by vibration absorbing member 20, the position of shutter baseplate 6 is set with respect to camera body 1. Moreover, vibration absorbing member 20 allows movement of shutter baseplate 6 in the up and down and the left and right directions through elastic deformation. However, movement in the left and right directions is restricted by retaining member 10 and slotted hole 16 such that movement is possible only in the up and down directions. Furthermore, vibration absorbing member 20 prevents, together with buffer members 12, impacts and vibrations which accompany the opening and closing movements of light barrier member 7 from reaching camera body 1 via shutter baseplate 6 and position setting member 11.

Buffer members 12 have a thin, long, polygonal rod shape and, similar to vibration absorbing member 20, are made of a material having rubber-like elasticity. Buffer members 12 are interposed between upper and lower ends of shutter baseplate 6 and camera body 1. In this case, one buffer member 12 is located at an upper end side of shutter baseplate 6 and two buffer members 12 are located at a lower end side of shutter baseplate 6 for a total of three buffer members. However, the number of buffer members can be suitably altered. Buffer members 12 are fixed to either camera body 1 or shutter baseplate 6 by suitable means such as adhesive tape or screws.

With reference to FIG. 4, insert 28 of shutter baseplate 6 is integrally arranged to extend into slot 27 of camera body 1. Insert 28 is inserted from above to slide freely within slot 27 as illustrated in FIGS. 1 and 4. Accordingly, the movement of shutter baseplate 6 in the optical axis direction (the direction of arrow C in FIG. 4) is restricted.

In such a support structure of a focal plane shutter according to the preferred embodiments of the present invention, the shutter baseplate 6 is movably supported with respect to the travel direction of light barrier member 7. In addition, because buffer members 12 and vibration absorbing member 20 have been interposed between camera body 1 and shutter baseplate 6, the impacts and vibrations which arise at the time of the opening and closing of light barrier members 7, and which would otherwise reach the camera body via shutter baseplate 6, can be mitigated. Accordingly, camera blurring motions and other adverse effects on photographs can be reduced.

Moreover, in comparison with the anti-vibration structures of the prior art which used balance weights, the preferred embodiments of the present invention have a structure which is simple and which reduces the number of components. According to the preferred embodiments of the present invention, it is a further advantage that the support structure is inexpensive to manufacture. Furthermore, another advantage over the anti-vibration structures of the prior art is that shutter baseplate 6 is not moved by setting member 9 because shutter charging force F is transverse to the travel direction of shutter baseplate 6.

According to the preferred embodiments of the present invention, a shutter has been adopted in which plural shutter vanes travel in the up and down directions. However, the present invention can also be embodied as a shutter which travels in the left and right directions.

According to the preferred embodiments of the present invention, shutter baseplate 6 is movably supported in the travel direction of light barrier member 7 with respect to the camera body 1. In addition, because buffer members 12 are interposed between shutter baseplate 6 on two sides of light barrier member 7 in the travel direction, the structure is simplified and the number of components is small. Thus, impacts and vibrations arising at the time of the opening and closing operations of the shutter which reach the camera body via the shutter baseplate can be mitigated, and no adverse impact and vibration effects are present on photographs which are taken.

According to the preferred embodiments of the present invention, retaining member 10 maintains shutter baseplate 6 movably in the travel direction of light barrier member 7. Buffer member 12 absorbs the impacts and vibrations which accompany the travel of light barrier member 7, such that the impacts and vibrations do not reach the camera body 1 via the shutter baseplate 6. The vibration absorbing member 20 which supports position setting member 11, in the same manner, absorbs the impacts and vibrations which occur during the travel of the light barrier member 7, such that impacts and vibrations do not reach the camera body 1 via the shutter baseplate 6 and the position setting member 11. Moreover, the vibration absorbing member 12 makes possible, by elastic deformation, the movement of the shutter baseplate 6. The shutter baseplate 6 does not move due to the shutter charging force because retaining member 10 is located in a position which extends in the direction of the shutter charging force F.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A support structure of a focal plane shutter in a camera, comprising:

a camera body;

a plurality of light barrier members to move in a travel direction with respect to said camera body;

a shutter baseplate supporting said light barrier members and movable in the travel direction;

a first buffer member disposed between a first side of said shutter baseplate and said camera body in the travel direction; and a second buffer member disposed between a second side of said shutter baseplate and said camera body in the travel direction.

2. The support structure according to claim 1, further comprising:

a position setting member connected between said camera body and said shutter baseplate to thereby set a position of said shutter baseplate with respect to said camera body.

3. The support structure according to claim 2, further comprising:

a retaining member connected to said camera body and said shutter baseplate, wherein said retaining member restricts movement of said shutter baseplate to the travel direction.

4. The support structure according to claim 3, further comprising:

a setting member which applies a shutter charging force to open said light barrier members, wherein the direction of the shutter charging force is orthogonal to the travel direction of said plurality of light barrier members.

5. The support structure according to claim 2, further comprising:

a vibration absorbing member disposed within said camera body and receiving said position setting member, wherein said vibration absorbing member absorbs vibration produced by said plurality of light barrier members during movement in the travel direction.

6. The support structure according to claim 1, further comprising:
a vibration absorbing member disposed within said camera body, wherein said vibration absorbing member absorbs vibration produced by said plurality of light barrier members during movement in the travel direction.

7. The support structure according to claim 6, further comprising:
a retaining member connected to said camera body and said shutter baseplate, wherein said retaining member restricts movement of said shutter baseplate to the travel direction.

8. The support structure according to claim 7, further comprising:
a setting member which applies a shutter charging force to open said light barrier members, wherein the direction of the shutter charging force is orthogonal to the travel direction of said light barrier members.

9. The support structure according to claim 1, further comprising:
a retaining member connected to said camera body and said shutter baseplate, wherein said retaining member restricts movement of said shutter baseplate to the travel direction.

10. The support structure according to claim 9, further comprising:
a setting member which applies a shutter charging force to open said light barrier members, wherein the direction of the shutter charging force is orthogonal to the travel direction of said light barrier members.

11. The support structure according to claim 1, wherein the camera has an optical axis direction orthogonal to the travel direction, said support structure further comprising:
a slot disposed within said camera body; and
an insert protruding from said shutter baseplate and received within said slot to thereby limit movement of said shutter baseplate in the optical axis direction.

12. A camera support structure, comprising:
a camera body;
a light barrier member to move in a travel direction with respect to said camera body;
a shutter baseplate supporting said light barrier member and movable in the travel direction; and
a retaining member connected to said camera body and said shutter baseplate, wherein said retaining member restricts movement of said shutter baseplate to the travel direction.

13. The camera support structure according to claim 12, wherein said shutter baseplate has a slotted hole and said retaining member passes through said slotted hole to connect with said camera body.

14. The camera support structure according to claim 13, wherein said retaining member is a stepped screw including:
a male screw portion,
a large diameter portion, and
a head portion,
wherein the male screw portion is threaded into a corresponding threaded hole within said camera body and the large diameter portion slidably connects with the slotted hole.

15. The camera support structure according to claim 12, further comprising:
a first buffer member disposed between a first side of said shutter baseplate and said camera body in the travel direction; and
a second buffer member disposed between a second side of said shutter baseplate and said camera body in the travel direction.

16. The camera support structure according to claim 12, further comprising:
a position setting member connected between said camera body and said shutter baseplate to thereby set a position of said shutter baseplate with respect to said camera body.

17. The camera support structure according to claim 12, further comprising:
a setting member which applies a shutter charging force to open said light barrier member, wherein the direction of the shutter charging force is orthogonal to the travel direction of said plurality of light barrier member.

18. The camera support structure according to claim 12, further comprising:
a position setting member connected between said camera body and said shutter baseplate to thereby set a position of said shutter baseplate with respect to said camera body; and
a vibration absorbing member disposed within said camera body and receiving said position setting member, wherein said vibration absorbing member absorbs vibration produced by said plurality of light barrier members during movement in the travel direction.

19. A support structure of an optical focal plane shutter, comprising:
a body;
a plurality of light barrier members to move in a travel direction with respect to said body;
a shutter baseplate supporting said light plurality of barrier members and movable in the travel direction;
a first buffer member disposed between a first side of said shutter baseplate and said body in the travel direction;
a second buffer member disposed between a second side of said shutter baseplate and said body in the travel direction;
a position setting member connected between said body and said shutter baseplate to thereby set a position of said shutter baseplate with respect to said body; and
a retaining member connected to said body and said shutter baseplate, wherein said retaining member restricts movement of said shutter baseplate to the travel direction.

20. The support structure according to claim 19, further comprising:
a setting member which applies a shutter charging force to open said light barrier members, wherein the direction of the shutter charging force is orthogonal to the travel direction.

* * * * *